Oct. 27, 1964     R. J. HOULDIN ETAL     3,154,730

SPEED CONTROL OF A D.C. MOTOR

Filed March 14, 1961

INVENTORS
RUSSELL J. HOULDIN
MALVIN S. BILSBACK

BY *Robert W. Berney*

ATTORNEY

United States Patent Office 3,154,730
Patented Oct. 27, 1964

3,154,730
SPEED CONTROL OF A D.C. MOTOR
Russell J. Houldin and Malvin S. Bilsback, Poughkeepsie, N.Y., assignors to International Business Machines Corporation, New York, N.Y., a corporation of New York
Filed Mar. 14, 1961, Ser. No. 95,738
2 Claims. (Cl. 318—302)

This invention relates to a motor speed control system and more particularly to a control system wherein a D.C. motor speed is controlled by a pulse source having a variable frequency.

This invention finds advantageous use in environments wherein the speed of a motor must be accurately controlled. This invention not only provides accurate control of motor speed but also provides for a speed control over a very wide range and in either direction. The combination of these features is not easily found in prior art control systems. Accurate speed control of D.C. motors over a wide range has required, in prior art devices, the use of manual or mechanical manipulation of rheostats to control a voltage impressed upon the motor. An obvious disadvantage of these speed control systems is the likelihood of personnel errors in manual manipulation and changing mechanical tolerances after continued use.

The primary object of this invention is to provide accurate D.C. motor speed control by electronic means.

Another object of this invention is to provide D.C. motor speed control by electronic means capable of accurate control over a wide range of motor speeds.

These and other objects of the invention are realized in an actual embodiment thereof which includes a source of periodically recurring signals having a frequency proportional to the desired speed of a D.C. motor. The actual speed of the motor is indicated by a source of periodically recurring signals having a frequency proportional to the actual speed of the motor. Means are provided for applying varying periods of either forward, reverse or no torque to the motor. And a final means is provided, responsive to the torque applying means and the sequence of generation of the desired speed signal and the actual speed signal, for controlling the torque applying means to accelerate or decelerate the motor to match the rate of the actual speed signal to the rate of the desired speed signal.

The foregoing and other objects, features and advantages of the invention will be apparent from the following more particular description of a preferred embodiment of the invention, as illustrated in the accompanying drawings.

Figure 1:
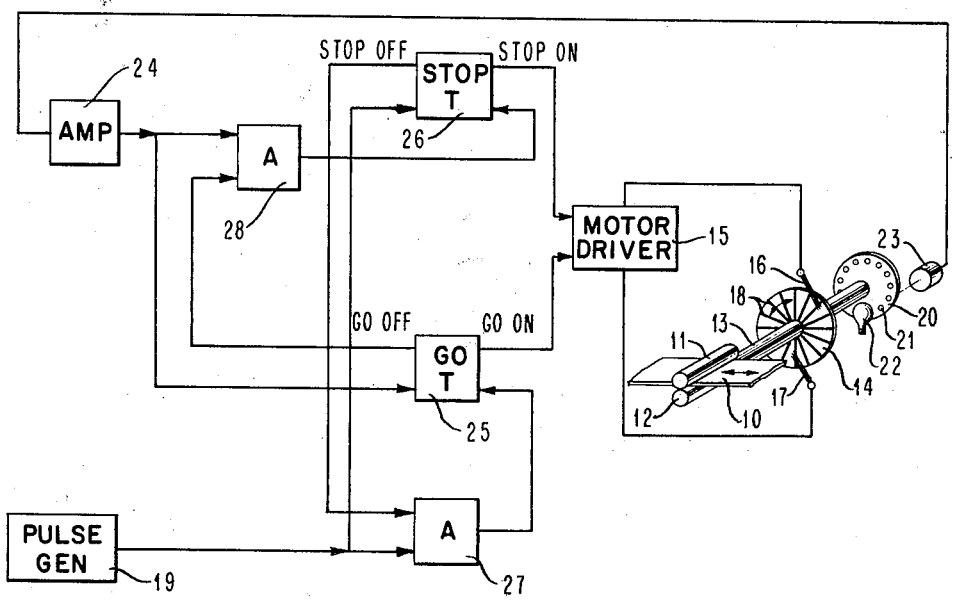
FIG. 1 is a schematic representation of the electronic logic required for controlling the speed of a D.C. motor.

Before proceeding with a detailed description of the invention, an actual environment for the invention will be briefly described. In the field of data processing, wide use is being made of magnetic recording of binary data. Although there are several types of magnetic recorders in existence, these devices have been built to operate at very specific speeds. The specific speeds have been dictated because of the necessity for knowing that each character of a series of characters is recorded or read at a definite frequency with a definite spacing between characters on the magnetic tape. A problem is encountered with these tape devices when it becomes necessary to match the rate at which the tape devices read or write magnetic characters to the rate at which another data processing device may operate on the data. As a consequense, a tape device must read or write magnetic characters to or from a buffer system which accumulates a series of characters at a first rate and then presents the accumulated characters to another device at a different rate. This invention was developed for a tape system to alleviate the need for a buffer system between the tape unit and another unit having a different rate for processing binary information. This has been accomplished by providing a tape drive capable of operating at a constant rate of speed over a very wide range of speeds.

Although the logic disclosed can be used for any type of D.C. motor, the system was initially developed to utilize transistor circuitry. The D.C. motor which is used to drive a capstan, and ultimately the magnetic tape, is a D.C. printed circuit motor which may be purchased from the Photo Circuits Corporation of Glen Cove, New York. This D.C. printed circuit motor has an armature which is a flat rotating disk, mounted in a perpendicular magnetic field. Brushes ride directly on 96 conductors which are printed on the flat disk. Current flowing through the brushes will generate torque, rotating the disk. A current reversal will cause reversal of torque and rotation. This D.C. motor has very low inertia, very low resistance, low inductance and smooth torque due to the large number of conductors. The result is a low voltage, high current, negligible arching device very well suited for transistor circuitry. The low electrical time constant gives current rise times in the microsecond region thus giving inherently fast torque build-up. The smooth torque makes it possible to control the motor at low speeds and therefore makes a gear train between it and the tape capstan unnecessary. These characteristics of the printed circuit motor make it very desirable for magnetic tape drives wherein the tape speed may be controlled over a large range, the tape may be accelerated and decelerated in a very short period, the single motor and capstan can provide both forward and reverse tape motion, and can also provide for increased speeds for short durations to create inter-record gaps. Details of circuits for performing the various logic operations may be found in U.S. Patent No. 3,049,295. These are representative circuits but any suitable binary logic devices can be used.

In FIG. 1 there is shown a tape 10 being pinched between a pinch roller 11 and a capstan 12. The capstan 12 is driven by a shaft 13 connected to the disk armature 14 of a printed circuit motor as described above. (The magnetic field has not been shown.) A motor driver 15 provides current through brushes 16 and 17 to the printed conductors 18 of the disk 14. The motor driver 15 is suitably arranged to provide current through the brushes 16 17, and conductors 18 in a forward or reverse direction to produce forward or reverse torque to the printed circuit motor.

A pulse generator 19 provides a source of periodically recurring signals to indicate the desired speed of the motor. The pulse generator 19 provides a series of pulses having a frequency proportional to the frequency at which magnetic characters are to be read or written from the tape 10. The pulse generator 19 may take many forms. The generator 19 could be a master oscillator operating on a pre-determined frequency and may provide a series of pulses at this pre-determined frequency or it may logically provide a series of pulses at a frequency which is a submultiple of the pre-determined frequency. An electronic choice can easily be made by those skilled in the art for causing generator 19 to provide a variable frequency. The pulse generator 19 could also be a unit of a device which is to transfer characters to or from the magnetic tape. The rate at which this device handles the binary characters will then control the speed at which the magnetic tape device reads or writes the characters.

The actual motor speed is indicated by a source of signals produced by an optical timing disk 20 which has the same angular velocity as the disk 14 and capstan 12. The timing disk 20 has a series of holes 21 which alternately permit and interrupt the transmission of light from a source 22 to a photo-cell 23. Therefore, as the tape capstan 12, the disk 14, and the timing disk 20 rotate, pulses will be generated at a frequency proportional to the motor speed. These pulses are amplified by an amplifier 24 and applied to the motor speed logic.

As an incidental matter in connection with the actual embodiment of the present invention, the pulses generated by the timing disk 20 are also utilized to initiate the writing of characters on the magnetic tape, such that characters are written with a spacing which is constant regardless of the actual tape motion.

Figure 3:
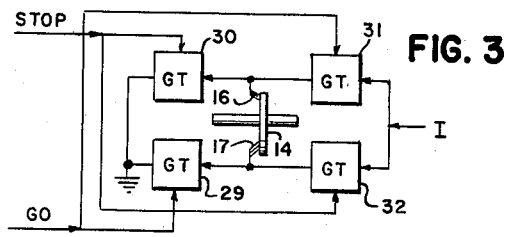
FIGURE 3 shows logic of a motor driver for reversing the current to a motor armature in response to speed control logic shown in FIGURE 1.

Torque applying means, which provides current in either of two opposite directions to the brushes 16 and 17, includes in addition to the motor driver 15 a first bistable device in the form of a GO trigger 25 and a second bistable device in the form of a STOP trigger 26. The two stable states of the triggers 25 and 26 have been designated on and off. When GO trigger 25 is in the on stable state motor driver 15 (see FIGURE 3) will provide forward current through a gate 31, the brushes 16 and 17, and a gate 29, to cause forward torque to accelerate the motor in a forward direction. When the STOP trigger 26 is in the on stable state the motor driver 15 will provide reverse current through a gate 32, brushes 16 and 17, and a gate 30, applying a reverse torque to the motor to decelerate the motor.

Torque controlling means includes in addition to the pulses from generator 19 and timing disk 20 an AND circuit 27 and an AND circuit 28. The torque controlling means operates logically in response to the on or off status of triggers 25 and 26 and the sequence of generation of pulses from generator 19 and amplifier 24. The inputs to triggers 25 and 26 are such that a pulse at the on side of a particular trigger is effective only to switch the trigger from the off stable state to the on stable state. If the particular trigger is already in the on stable state a pulse to that input will be ineffective. The same is true of an input to the off side of a particular trigger which is effective only to switch the trigger from the on stable state to the off stable state.

Considering the GO trigger 25 it can be seen that the GO trigger 25 will be turned on by a pulse from AND circuit 27 only if STOP trigger 26 is off and the GO trigger 25 is off at the time of the occurrence of a pulse from generator 19. The GO trigger 25 will be switched from the on stable state to the off stable state upon the occurrence of a pulse from amplifier 24.

In a like manner STOP trigger 26 is turned on by a pulse from AND circuit 28 only if STOP trigger 26 is in the off stable state and the GO trigger 25 is in the off stable state at the time of the occurrence of a pulse from amplifier 24. STOP trigger 26 will be switched from the on stable state to the off stable state upon the occurrence of a pulse from generator 19.

Figure 2:
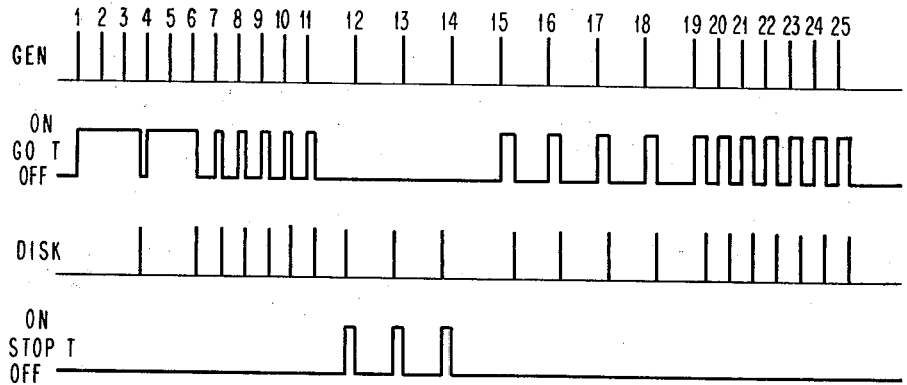
FIG. 2 shows a series of wave forms produced by certain of the control components of FIG. 1.

The operation of the logic shown in FIG. 1 may be followed in connection with FIG. 2. FIG. 2 shows a series of wave forms which include from top to bottom a series of pulses from generator 19, the two stable states of GO trigger 25, a series of timing disk pulses from amplifier 24, and the two stable states of the STOP trigger 26. The pulses in the top wave form have been numbered in order to facilitate identification of various time periods.

At the occurrence of pulse 1, we will assume that the motor is at rest with both triggers 25 and 26 in the off stable state applying no torque to the motor. In this situation AND circuit 27 will be conditioned with STOP trigger 26 off such that GO trigger 25 will be turned on to start the application of forward torque through the motor driver 15. Pulses 2 and 3 will have no effect on GO trigger 25 as it is already in the on stable state. As the motor accelerates, a disk pulse will be generated when the first hole 21 passes between the light source 22 and the photo cell 23. Since the GO trigger 25 is on, AND circuit 28 will not be conditioned and there will be no input to the STOP trigger 26. The disk pulse will be effective, however, to turn the GO trigger 25 from the on stable state. Pulse 4 will immediately follow the first disk pulse and again turn on the GO trigger 25. This will apply an additional period of forward torque to the motor to increase its speed. As before, the next disk pulse will turn off the GO trigger 25. This will occur immediately after pulse 6. Pulse 7 will again turn on the GO trigger 25 and the immediately following disk pulse will turn off the GO trigger 25. At the occurrence of pulse 7 it is shown in FIG. 2 that the speed of the motor is now producing speed indicating pulses through amplifier 24 at a frequency which is equal to the frequency of the pulses from generator 19. In this situation, the GO trigger 25 will be turned on only for a period sufficient to provide forward torque to maintain the motor speed at a constant value. Therefore from pulse 7 through pulse 11 it can be seen that disk pulses are being generated at the same frequency.

Assume now that after the occurrence of pulse 11 it is desired to decrease the speed of the motor by one half. This might possibly lead to a situation wherein the motor would run at the same speed on a second harmonic. This possibility is alleviated by the inclusion of the STOP trigger 26. As the period between pulses 11 and 12 has been doubled, two disk pulses will occur in succession as the motor speed will not have dropped to the lower speed. At the time of the occurrence of the second of the successive disk pulses the torque applying means will be in a condition such that both the GO trigger 25 and the STOP trigger 26 are in the off stable state. When this situation occurs AND circuit 28 will be conditioned by the off stable state of GO trigger 25 and will produce a pulse to turn STOP trigger 26 from the off stable state to the on stable state to commence the application of reverse torque to the motor through motor driver 15. Between pulses 11 and 14, periods of reverse torque will be applied to the motor through the driver 15 to reduce the speed of the motor.

The speed of the motor is reduced by the STOP trigger 26 until such time as two generator pulses occur between two disk pulses. This indicates that the motor speed has dropped to a value below the speed indicated by the generator pulses. When this situation arises the GO trigger 25 will again be brought into play to maintain the speed at the desired level. In FIG. 2 it can be seen that pulses 14 and 15 occur between two disk pulses. In this situation with the STOP trigger 26 in the off condition and the GO trigger 25 in the off condition AND circuit 27 will be conditioned and effective to apply a pulse to GO trigger 25 to turn it on. This occurs at pulse 15. Immediately after pulse 15 a disk pulse will be generated to turn off the GO trigger 25. During the period from pulse 15 through pulse 18 it can be seen that disk pulses are being generated at the same frequency as the generator pulses and the GO trigger 25 produces periods of forward torque to maintain this motor speed.

Using the same logic as previously described, FIG. 2 has depicted a situation where the frequency of the pulses from generator 19 is again increased. Therefore an increased number of forward torque periods is applied to the motor to increase its speed such that the disk pulses are again generated at a frequency equal to the generator pulses.

There has now been described a very simple logical system for electronically controlling the speed of a D.C. motor. No manual or mechanical manipulations are required for controlling the speed. The speed control has been placed entirely under electronic control whereby simple logic manipulations, well known to those skilled in the art, can be utilized for affording a wide range of speeds. A person skilled in the art will recognize that the motor driver 15 can be made to reverse the direction of rotation of the motor and control its speed using the same logic by merely reversing the electrical connections to the brushes 16 and 17. It should be mentioned at this point that the actual embodiment of this invention was utilized to match the character rate of the tape device to a particular data processing device. The actual use was such that the tape drive was only required to produce a predetermined speed for reading and writing and a second speed for inter-record gaps and back-spacing. It is readily apparent that the same logic shown in FIG. 1 may be utilized in a system where only a single constant speed is required. It is further apparent that even though a device utilizing this speed control may require only a single constant speed, the same motor speed control may be utilized in many systems each having different requirements as to speed.

While the invention has been particularly shown and described with reference to a preferred embodiment thereof, it will be understood by those skilled in the art that various changes in form and details may be made therein without departing from the spirit and scope of the invention.

What is claimed is:

1. A synchronous motor control system comprising:
   a source of speed control pulses occurring at a predetermined rate;
   a source of motor speed indicating pulses, the rate of generation of which it is desired to make equal said control pulse rate;
   a first bistable device having on and off states operative to apply forward torque to said motor when in the on state;
   a second bistable device having on and off states operative to apply reverse torque to said motor when in the on state;
   means connecting said speed indicating pulse source to said first bistable device operative to switch said first device from the on state to the off state;
   means connecting said control pulse source to said second bistable device operative to switch said second device from the on state to the off state;
   first gating means responsive to a pulse from said control pulse source and the off state of said second bistable device, operative to switch said first bistable device from the off state to the on state;
   and second gating means responsive to a pulse from said speed indicating pulse source and the off state of said first bistable device, operative to switch said second bistable device from the off state to the on state.

2. A synchronous motor control system comprising:
   a first source of pulses having a frequency proportional to the desired motor speed;
   a second source of pulses having a frequency proportional to the actual motor speed;
   means operable to provide forward, reverse or no torque to said motor;
   means connecting each of said pulse sources to said torque providing means, said connecting means from said first source operative during a period of reverse torque to cause a pulse from said first source to remove the reverse torque to said motor, said connecting means from said second source operative during a period of forward torque to cause a pulse from said second source to remove the forward torque to said motor;
   and means conditioned by said torque providing means connecting each of said pulse sources to said torque providing means, said conditioned connecting means from said first source operative during a period of no torque to cause a pulse from said first source to start the application of forward torque to said motor, said conditioned connecting means from said second source operative during a period of no torque to cause a pulse from said second source to start the application of reverse torque to said motor.

References Cited in the file of this patent

UNITED STATES PATENTS

| | | |
|---|---|---|
| 2,682,167 | Gamarekian | June 29, 1954 |
| 2,932,778 | Curtis | Apr. 12, 1960 |
| 3,005,940 | Johnson | Oct. 24, 1961 |